(12) United States Patent
Hayashide

(10) Patent No.: US 7,062,106 B2
(45) Date of Patent: Jun. 13, 2006

(54) IMAGE PROCESSING APPARATUS AND IMAGE PROCESSING METHOD

(75) Inventor: Tadao Hayashide, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 779 days.

(21) Appl. No.: 10/097,205

(22) Filed: Mar. 12, 2002

(65) Prior Publication Data

US 2002/0131648 A1    Sep. 19, 2002

(30) Foreign Application Priority Data

Mar. 13, 2001    (JP) .............................. 2001-070456

(51) Int. Cl.
  *G06K 9/40*    (2006.01)
(52) U.S. Cl. .................. 382/275; 382/298; 358/3.26; 250/341.8
(58) Field of Classification Search ................ 382/275, 382/255, 231, 298, 300, 318; 358/1.2, 3.26, 358/505, 509, 528; 250/341.8, 339.11, 349, 250/393, 201.2, 559.02, 559.06
See application file for complete search history.

(56) References Cited

U.S. PATENT DOCUMENTS

| 6,123,261 A * | 9/2000 | Roustaei ................ 235/462.01 |
| 6,195,161 B1 * | 2/2001 | Edgar ...................... 356/237.1 |
| 6,720,560 B1 * | 4/2004 | Edgar et al. ............. 250/341.8 |
| 6,775,419 B1 * | 8/2004 | Maeda et al. ................ 382/275 |
| 6,791,721 B1 * | 9/2004 | Konogaya et al. .......... 358/474 |

FOREIGN PATENT DOCUMENTS

| JP | 2000-324303 | 11/2000 |
| JP | 2001-189833 | 7/2001 |

* cited by examiner

*Primary Examiner*—Sheela Chawan
(74) *Attorney, Agent, or Firm*—Morgan & Finnegan, LLP

(57) ABSTRACT

An image processing apparatus for processing visible image information and invisible image information obtained from visible light and invisible light directed onto an original and from the original onto an image pick-up element via a focusing optical system. The image processing apparatus includes an infrared light source, a visible light source, a focus correction unit that corrects the focus of the images when the images are formed on the image pick-up element and acquired, and a signal processor that corrects a partial magnification difference between the visible image and the infrared image.

18 Claims, 13 Drawing Sheets

IMAGE PROCESSING APPARATUS AND IMAGE PROCESSING METHOD

FIELD OF THE INVENTION

The present invention relates generally to an image processing apparatus and an image processing method, and more particularly, to an image processing apparatus and an image processing method for processing visual image information and invisible infrared image information obtained by directing both visible light and invisible infrared light that has passed through a transparent original onto a fixed image pick-up element via an image formation system.

BACKGROUND OF THE INVENTION

In the image reading apparatuses that convert image information of a transparent original into electrical signals which are then read into a computer, film scanners such as those described in Japanese Laid-Open Patent Application Nos. 2000-324303 and 2001-189833 have been proposed, as apparatuses that use infrared light (which cannot be seen) to acquire dust and scratch mark information and to correct those portions of the visible image information that correspond to the locations of the dust and scratch marks.

FIG. 1 is a schematic diagram of such a conventional film scanner. FIG. 2 shows a conventional example of partial magnification. FIG. 3 shows a conventional example of read acquisition and image output.

As shown in FIG. 1, the film scanner is provided with an invisible (infrared) light source 1001 and a visible light source 1002. Image information from the film 1003 that is illuminated and read by one or the other of these two light sources is reflected by a mirror 1006, passed through a focusing lens 1007 and formed into an image on a line CCD 1008 aligned in a main scanning direction. The film 1003 is moved in a sub-scanning direction by a drive unit 1005 via a film mount 1004, with two-dimensional image information being read therefrom.

It will be noted that differences in wavelength between the invisible (infrared) light 1001 and the visible light 1002 cause the images thereof to form at different locations, so the apparatus is configured so that the focus is adjusted by the movement of an image pick-up unit 1009. The image pick-up unit 1009, which is moved by a focus drive unit 1010, is formed by combining the focusing lens 1007 and the line CCD 1008 into a single unit. The focus adjustment enables images based on both sources of light to be read when the focus is optimal. Additionally, because the two images are formed at different magnifications, the aforementioned Japanese Laid-Open Patent Application No. 2000-324303 also proposes correcting the overall magnifications by processing the invisible infrared image information using a signal processor 1011.

However, although the conventional apparatus described above can correct the overall magnification, as shown in FIG. 2, with a focusing optical system having partial magnification characteristics, correcting the overall magnification to fit the image periphery means that the magnification at the center of the image cannot be properly corrected. The result is that, as depicted in FIG. 3, the post-correction invisible (infrared) image (that is, the invisible infrared output image) shows partial distortion, with portions that do not match the magnification of the visible image.

The chief factors that cause differences in magnification of the infrared image and the visible image are differences in chromatic difference of magnification and comatic aberration due to the wavelength of the infrared light rays. With a focusing optical system such as that described above, correcting these differences in aberration requires a lens that uses expensive and hard-to-handle materials such as abnormal dispersion glass. The need for such correction has become especially apparent in recent years due to improvements in the read resolutions of image reading systems in particular, which tend to exaggerate differences in partial magnification.

SUMMARY OF THE INVENTION

The present invention was conceived with the above-described conventional examples in mind, and has as its object to provide a simple, low-cost and effective image processing apparatus and image processing method for matching the partial magnification of an invisible (infrared) image to a visible image so as to cleanly and accurately remove dust and/or scratch marks.

The above-described object of the present invention is achieved by an image processing apparatus for processing visible image information and invisible image information obtained from visible light and invisible light directed onto an original and from the original onto an image pick-up element via a focusing optical system, the image processing apparatus comprising a magnification correction unit that corrects a partial magnification of the invisible image information to match the visible image information.

Additionally, the above-described object of the present invention is also achieved by an image processing method for processing visible image information and invisible image information obtained from visible light and invisible light via a focusing optical system, respectively, the image processing method comprising the steps of directing visible light and invisible light onto an original, directing the light directed onto the original onto an image pick-up element, and correcting a partial magnification of the invisible image information to match the visible image information.

Additionally, the above-described object of the present invention is also achieved by an image processing program for processing visible image information and invisible image information obtained from visible light and invisible light directed onto an original and from the original onto an image pick-up element via a focusing optical system, the image processing program causing a computer to correct a partial magnification of the invisible image information to match the visible image information.

Other objects, features and advantages of the present invention besides those discussed above shall be apparent to those skilled in the art from the description of preferred embodiments of the invention that follows. In the description, reference is made to the accompanying drawings, in which like reference characters designate the same or similar parts throughout the drawings. The accompanying drawings form a part of the specification and illustrate examples of the invention. It is to be understood that such examples, however, are not exhaustive of the various embodiments and variations of the invention, and therefore reference is made to the claims that follow the description for determining the scope of the invention.

DESCRIPTION OF THE PREFERRED EMBODIMENTS

A detailed description will now be given of preferred embodiments of the present invention, with reference to the accompanying drawings.

A detailed description will now be given of an image processing apparatus according to a first embodiment of the present invention, with reference to FIGS. 4, 5, 6 and 7.

Figure 1:
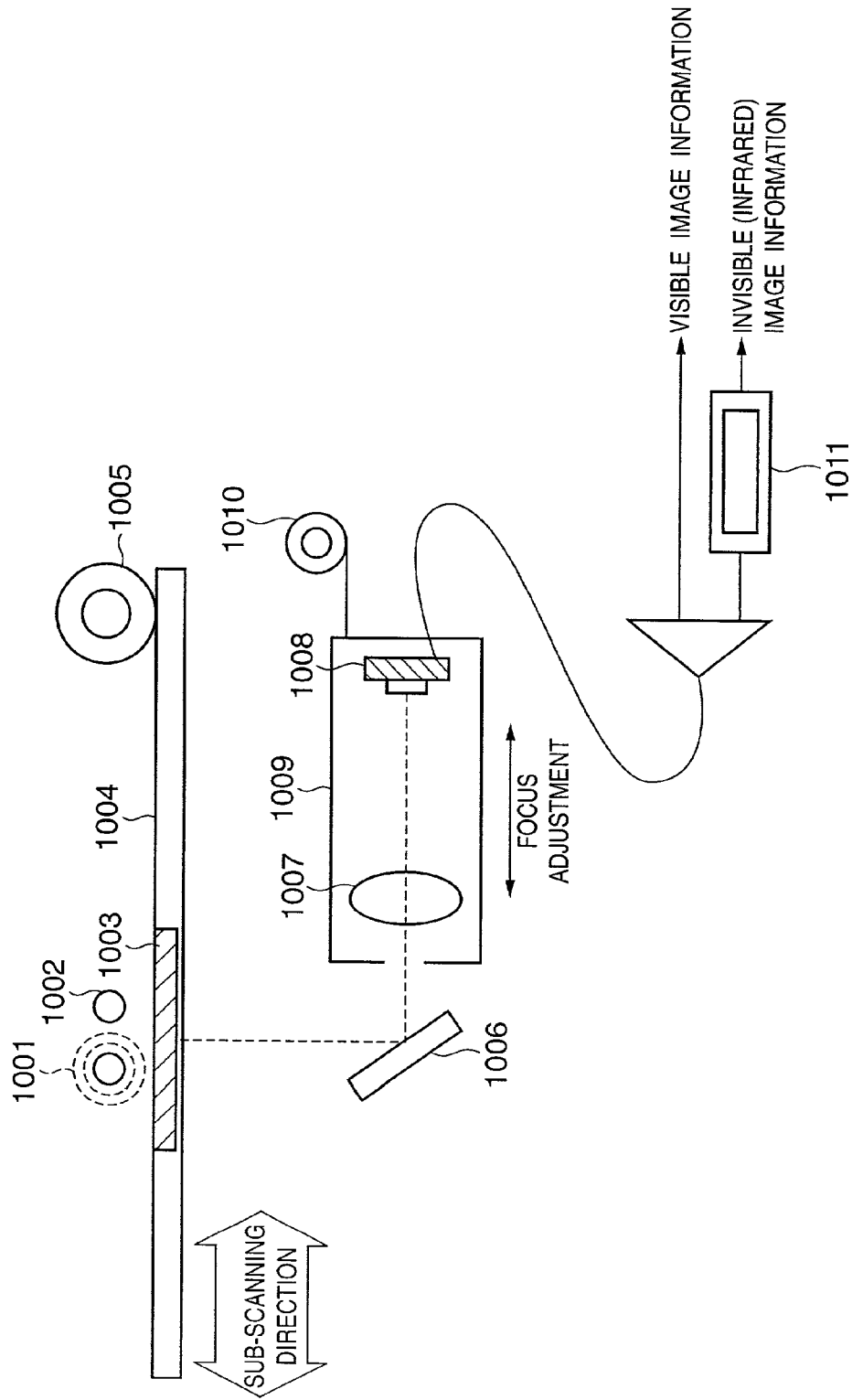
FIG. 1 is a schematic diagram of a conventional film scanner.
Figure 2:
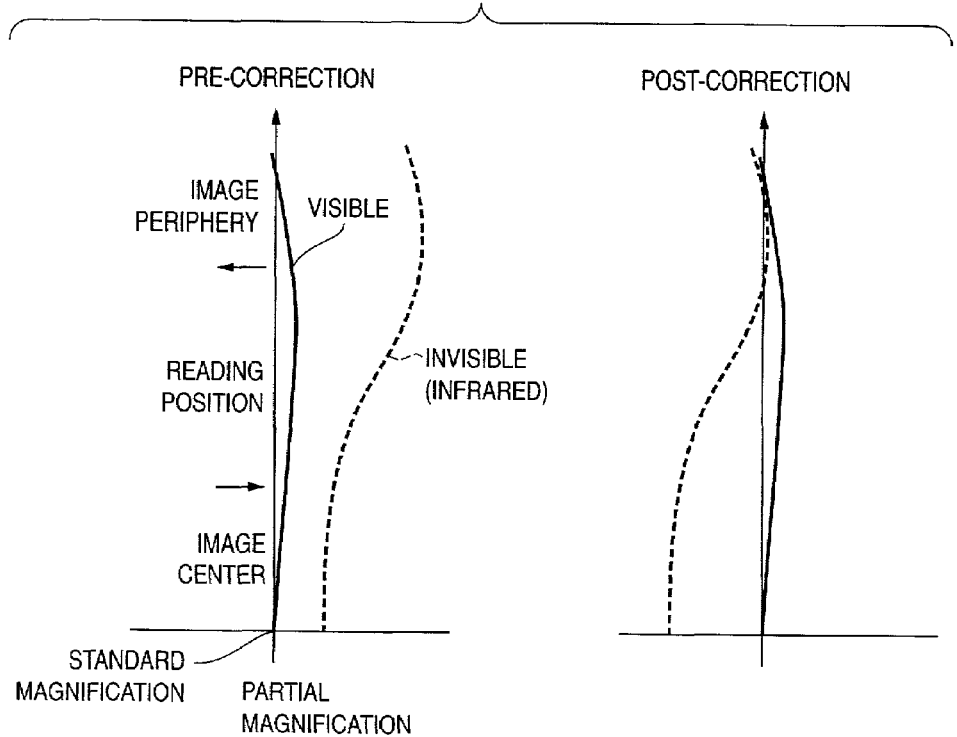
FIG. 2 shows a conventional example of partial magnification of an image.
Figure 3:
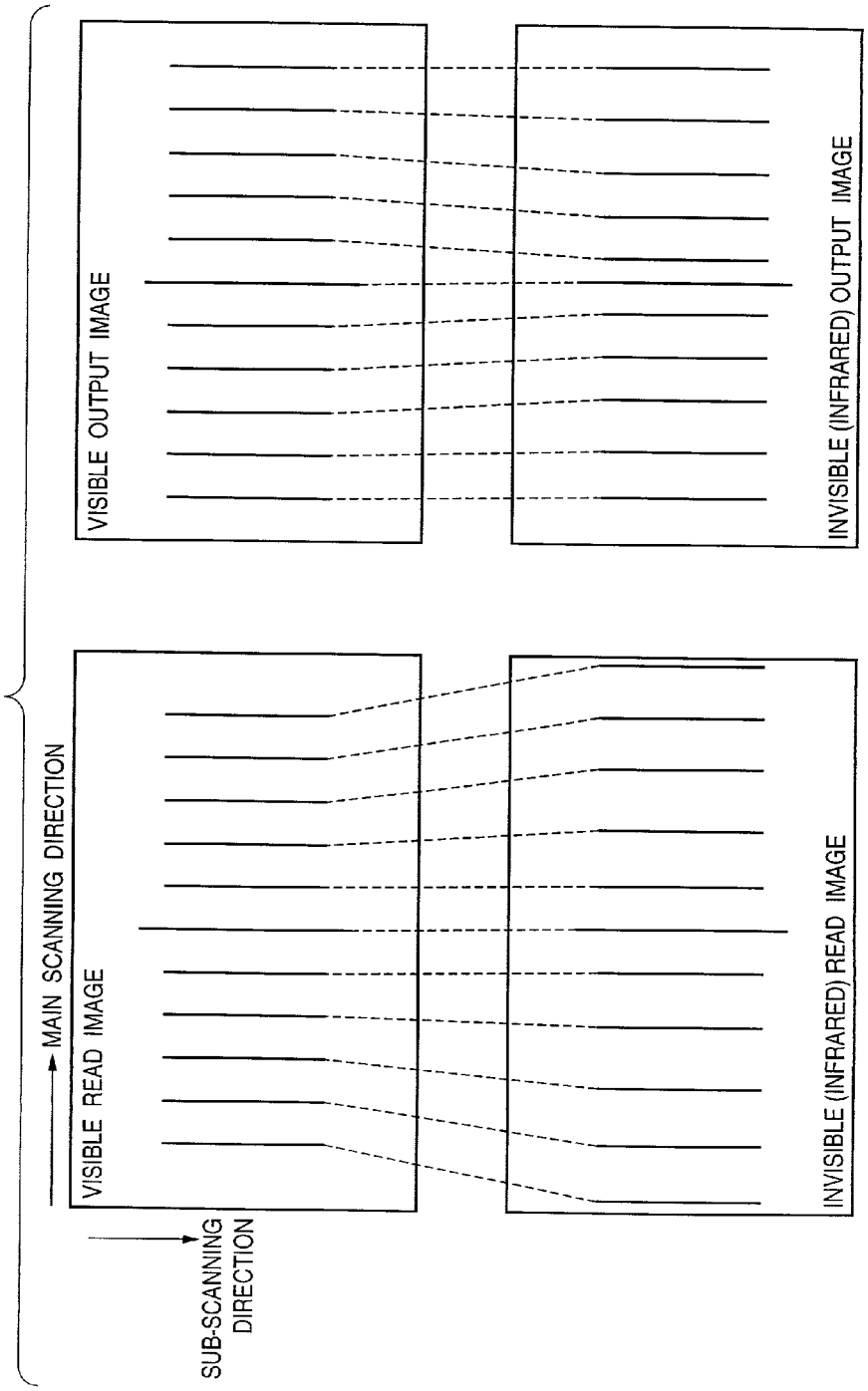
FIG. 3 shows a conventional example of read image and image output.
Figure 4:
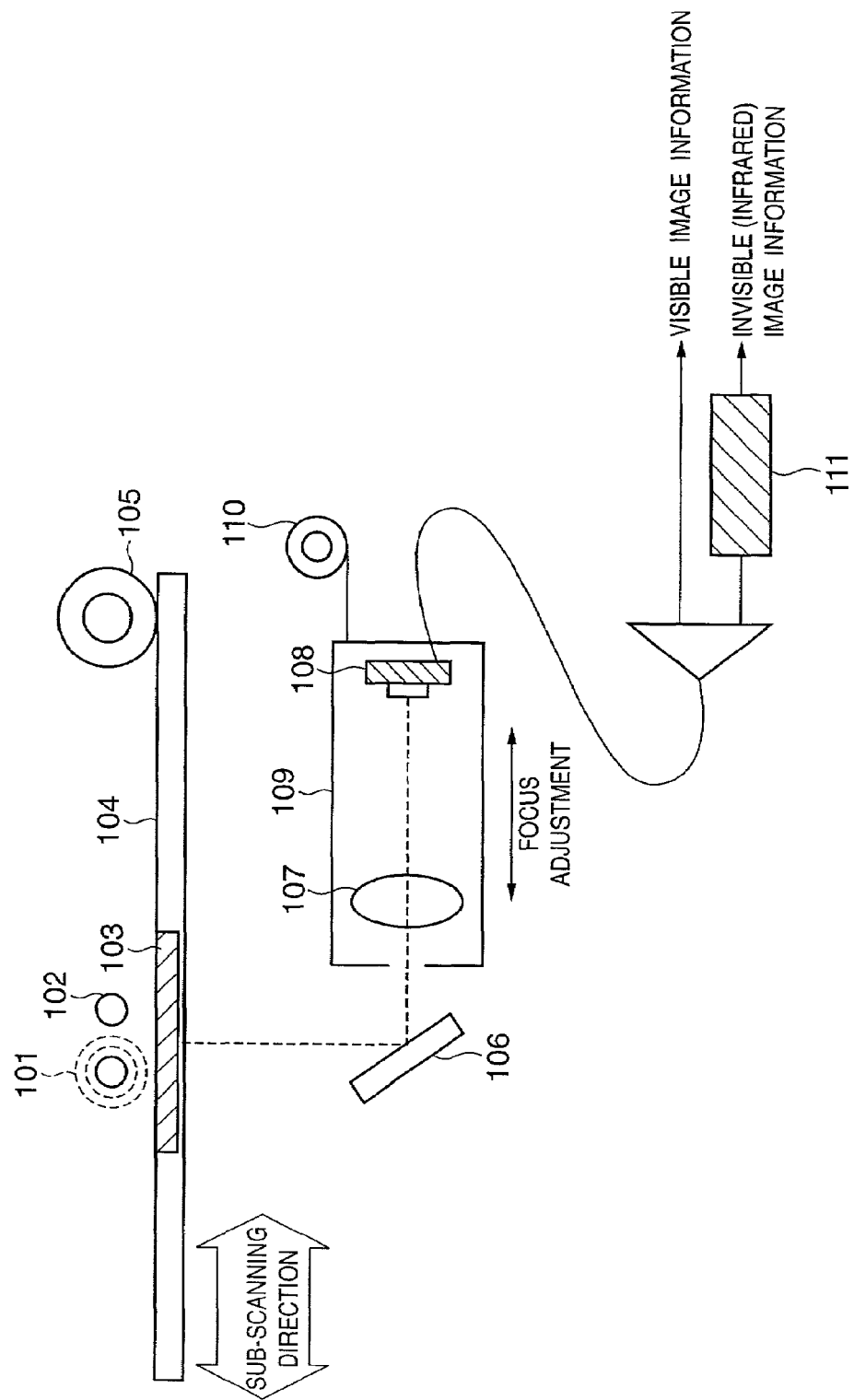
FIG. 4 is a schematic diagram of an image processing apparatus according to a first embodiment of the present invention.
Figure 5:
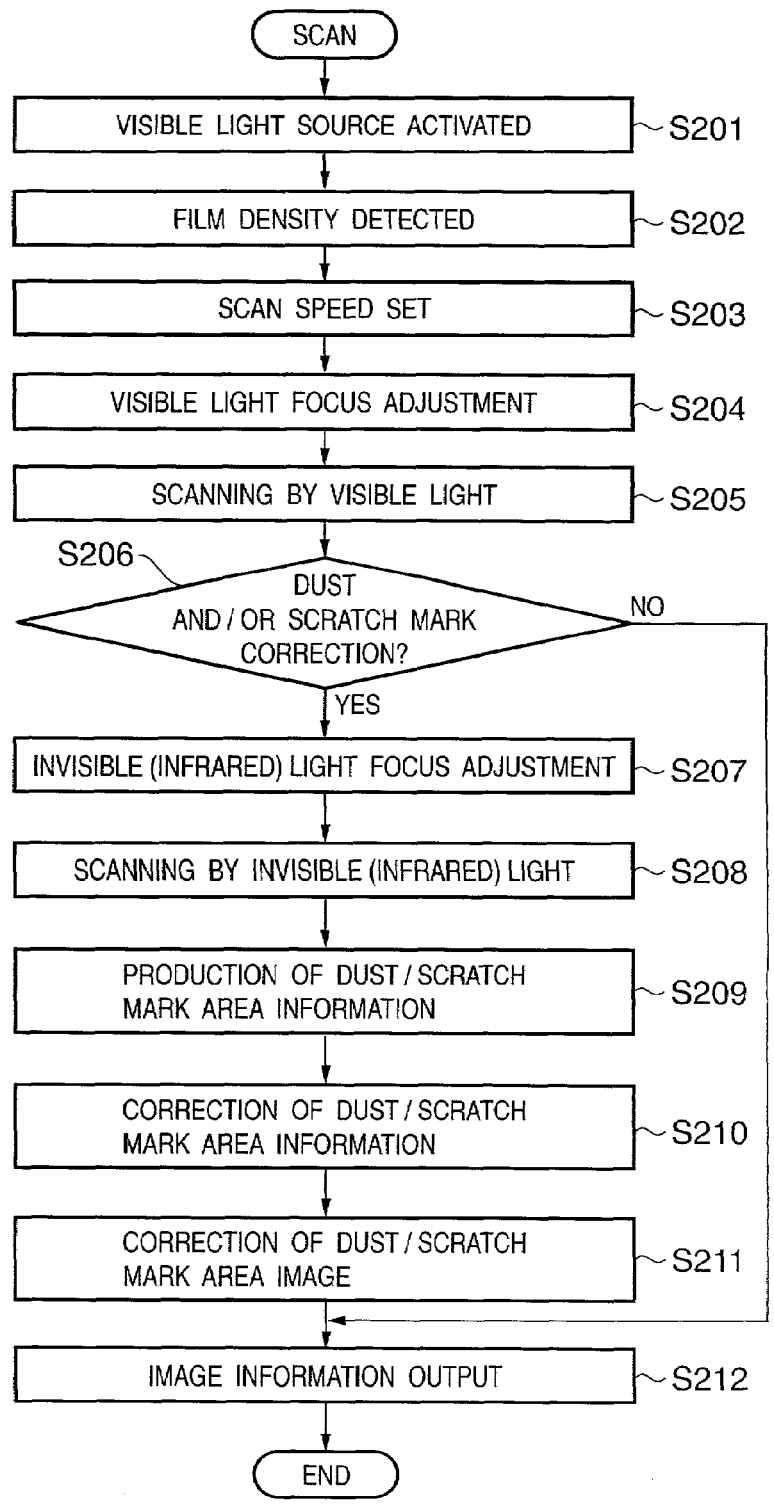
FIG. 5 is a flow chart showing steps in an operation performed by an image processing apparatus according to a first embodiment of the present invention.
Figure 6:
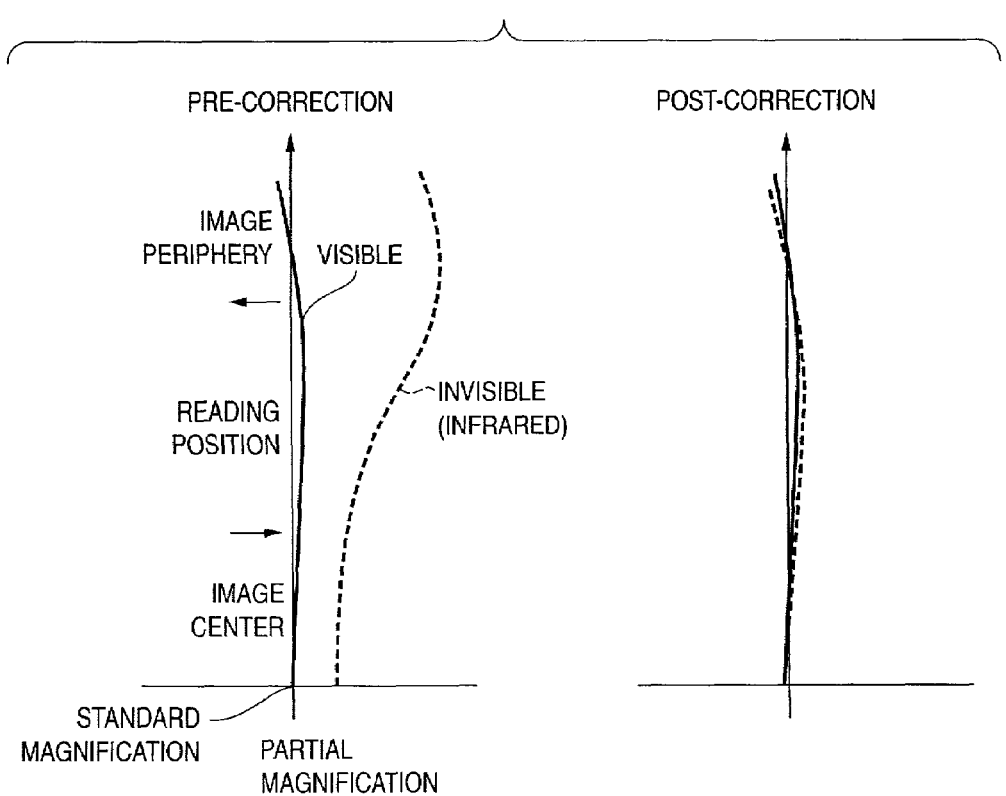
FIG. 6 shows partial magnification of an image by an image processing apparatus according to a first embodiment of the present invention.

FIG. 4 is a schematic diagram of an image processing apparatus according to a first embodiment of the present invention. FIG. 5 is a flow chart showing steps in an operation performed by an image processing apparatus according to a first embodiment of the present invention. FIG. 6 shows partial magnification of an image by an image processing apparatus according to a first embodiment of the present invention.

Figure 7:
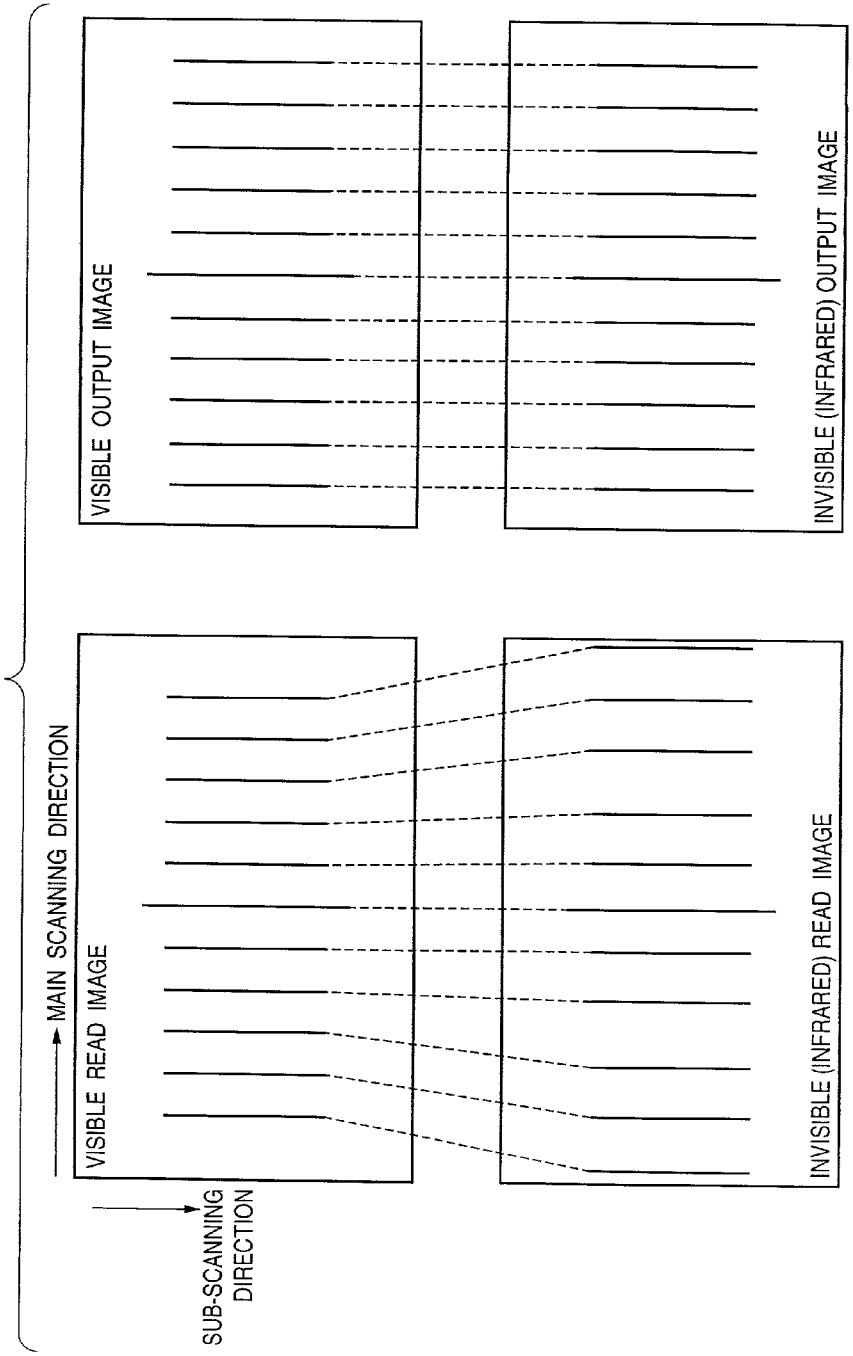
FIG. 7 shows read image and image output by an image processing apparatus according to a first embodiment of the present invention.

FIG. 7 shows read image and image output by an image processing apparatus according to a first embodiment of the present invention.

As shown in the diagram, image information of a transparent film 103 that is illuminated by an invisible (infrared) light source 101 and a visible light source 102 is reflected by a mirror 106, passed through a lens 107 and formed into an image (that is, focused) on a line CCD that is an image pick-up element aligned in a main scanning direction. The film 103 is moved in a sub-scanning direction by a drive unit 105 via a film mount 104. The images recorded on the film 103 are read by the line CCD 108 as two-dimensional image information.

However, the difference in wavelength between the invisible (infrared) light from the invisible (infrared) light source 101 and the visible light from the visible light source 102 means that the positions at which the invisible image and the visible image are formed differs, that is, the images come into focus at different locations. Accordingly, the present embodiment uses a focus drive mechanism 110 to drive an image pick-up unit 109 formed by the focusing lens 107 and the line CCD 108, so that the point of focus can be adjusted. As a result, the image information can be read in a state in which the invisible (infrared) image and the visible image are both at optimal focus.

A description will now be given of a sequence of operations performed by the image processing apparatus according to the above-described embodiment of the present invention, with reference to the flow chart depicted in FIG. 5.

It should be noted that that the series of operations depicted in the flow chart shown in FIG. 5 is recorded as a control program on a recording medium. The recording medium may be a CD-ROM. The recording medium is installed in an external device that is connected to the image processing apparatus. The external device may be a personal computer. The series of operations to be described below is then executed by a system controller of the image processing apparatus, based on commands from the external device.

In a step S201, the system controller drives a light source activation circuit (not shown in the drawings) that activates the visible light source, moving the process to a succeeding step S202.

In the step S202, the film density is detected. The drive unit 105 is driven so as to position the central axis of the light within the film image (for example, at or near the center of the film). Data on light intensity is then input from the line CCD 108 and exposure is controlled by gain adjustment so that the input value becomes the correct value. The film is then repositioned at an initial position and the process proceeds to the next step, S203.

At step S203, the results of the processes conducted at the preceding step S202 are used to determine the drive speed of the drive unit 105 during scanning. That is, when the light intensity is very weak and a sufficient amount of light cannot be obtained by gain adjustment alone, the speed of the drive unit 105 is reduced. When the routine executed by this step S203 is completed the process proceeds to the next step, S204.

In step S204, the image pick-up unit 109 described above is driven by the focus drive mechanism 110 in order to adjust the focus of the visible light, after which the process proceeds to a step S205.

It should be noted that, since the focus of the visible light and the focus of the invisible (infrared) light are not the same, the focus of the invisible (infrared) light is readjusted in a step S207 to be described later.

In step S205, scanning by visible light commences. In the event that the scanning range is specified by a command from the external device, the specified range is scanned. The image data that is produced is then stored on an offset RAM. When the routines conducted in step S205 have been completed the process proceeds to a step S206.

In step S206, it is determined whether or not an instruction to perform dust and/or scratch mark correction has been received at the time that the above-described command from the external device is received. If it is determined that an instruction to carry out dust and/or scratch mark correction has been received, then the process proceeds to a step S207. On the other hand, if it has been determined that no such instruction to perform dust and/or scratch mark correction has been received, then the process proceeds to a step S208.

In a step S207, the focus of the invisible (infrared) light is adjusted by driving the focus drive mechanism 110 so as to move the image pick-up unit 109 in the direction of the axis of light. The extent of the focus adjustment is the extent of the difference between the focal position of the visible light image and the focal point of the infrared light image. When the processes to be performed in step S207 have been completed, the process proceeds to step S208.

In step S208, scanning by invisible (infrared) light is undertaken, in order to detect the presence of dust and scratch marks on the film, after which the process proceeds to a step S209.

In a step S209, the information about the areas in which dust and/or scratch marks occur on the film is produced using the invisible (infrared) light image information read in the preceding step S208, after which the process proceeds to a step S210.

In step S210, the magnification of the region (position) information about the dust and/or scratch marks found on the film in the preceding step S209 is corrected, after which the process proceeds to a step S211. The magnification correction process of step S210 is described in detail later.

In step S211, the visible image information is corrected based on the dust and/or scratch mark film region information confirmed at the preceding step S210 and the image is processed so as to delete the dust and/or scratch marks. When the image processing of step S211 is completed, the process proceeds to a step S212.

In step S212, the corrected image information obtained in the preceding step S211 is output to the external device via an interface. When the routine executed in step S212 is completed, the drive unit and line CCD drive pulses are stopped, the film is returned to its initial position and the image processing apparatus enters a standby state, marking the end of the series of processes described above. The read sequence is thus completed, and the apparatus stands by to receive the next command.

A detailed description will now be given of the magnification correction process of step S210 mentioned above.

The focusing optical system of the image processing apparatus of the present embodiment has the partial magnification properties shown in FIG. 6, so the visible image information is output as is while partial magnification of the invisible (infrared) light image information is corrected by a signal processor 111 that is a magnification correction means, after which the invisible (infrared) light image information is output.

In terms of the input image information shown in FIG. 6, the signal processor 111 labels a reading picture element (pixel) located at the center of the focusing optical system as pixel 0, such that, when correcting position information for an image positioned at x pixels away from the center pixel 0 in a peripheral direction, the pixel position y after correction that is expressed in terms of the following formula using correction factors $a_0 \ldots a_n$:

$$y = a_n x^n + a_{n-1} x^{n-1} + a_0 \ldots a_n \quad (1)$$

It should be noted that the correction factors $a_0 \ldots a_n$ are set so that the infrared image pixel position information is substantially identical to the visible image pixel position information, the values of the factors being such as to be able to correct more complicated position information differences between the visible image and the infrared image as n grows larger. However, the calculations needed to set the numbers becomes more complicated as the number of correction factors increases, imposing a greater computational load on the signal processor 111. Therefore such an increase in the number of correction factors is undesirable. Accordingly, it is preferable to correct the invisible (infrared) image information on the basis of the following formula, which is obtained by selecting only certain values from among the correction factors $a_0 \ldots a_n$, for example $a_0$, $a_2$, $a_4$:

$$y \cong a_4 x^4 + a_2 x^2 + a_0 \quad (2)$$

According to the present embodiment, precise and accurate partial magnification correction can be achieved using the simple formula described above. It should be noted that approximately three correction factors are sufficient to correct magnification errors involving one to two inflection points as noted on the partial magnification graph described above with respect to the present embodiment. Additionally, if the right side of the equation is not a whole number, then such result can be simplified by rounding to the nearest whole number. Moreover, since the correction factors are already recorded in the memory that is the recording means there is no need to calculate the correction factors prior to image reading, with the result that image reading can proceed quickly.

Thus, as described above, the image processing apparatus according to the present invention can substantially match the partial magnification rates of the visible image information and the infrared (invisible) image information, so that, as shown in FIG. 7, the post-correction infrared (invisible) image information (that is, the infrared (invisible) output image) substantially matches the position information of the visible image information (that is, the visible output image), providing a film scanner that provides accurate deletion of dust and/or scratch marks.

As will be appreciated by those skilled in the art, the image processing apparatus of the present invention can be achieved with the above-described signal processor 111 built into the image processing apparatus or incorporated as driver software on a unit connected to the image processing apparatus. The unit may be a personal computer used as a controller.

A description will now be given of a second embodiment of an image processing apparatus according to a second embodiment of the present invention, with reference to the accompanying drawings, in the first instance FIG. 8.

Figure 8:
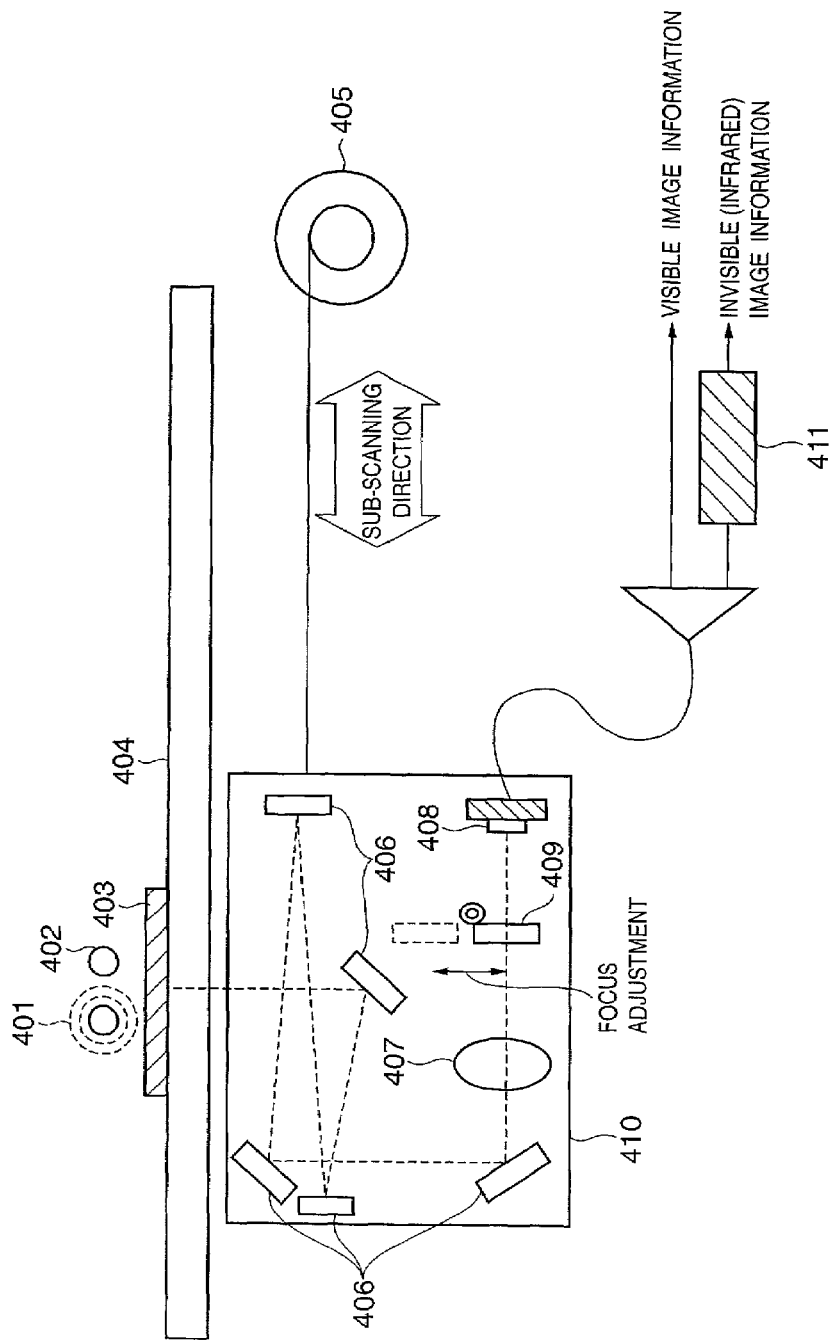
FIG. 8 is a schematic diagram of an image processing apparatus according to a second embodiment of the present invention.

FIG. 8 is a schematic diagram of an image processing apparatus according to a second embodiment of the present invention, more specifically of the essential parts of a so-called flathead scanner integrated with the carriage.

The image information of a film 403 that is a transparent medium which is illuminated by either an infrared light source 401 or a visible light source 402 is reflected by a plurality of mirrors 406 and passed through a focusing lens 407 to focus on a line CCD 408 arranged in a main scanning direction. The film 403 is mounted on a film glass 404.

The reflecting mirror 406, the focusing lens 40, the line CCD 408 and a focus correction unit 409 to be described in detail later are all disposed within a carriage 410. The carriage 410 is driven in a sub-scanning direction by a drive unit 405 and the images recorded on the film 403 are read as two-dimensional image information by the line CCD 408.

Additionally, the point of focus of the infrared light source 401 and the point of focus of the visible light source 402 are different because the wavelengths of infrared light and visible light are different, so the focus can be adjusted by the focus correction unit 409. The focus correction unit 409 consists of parallel plates of glass and a drive motor, the drive motor positioning the parallel glass plates either on or above the axis of light. Providing such a focus adjustment unit enables the image information to be read in a state in which both the visible image and the invisible image are optimally focused.

The visible image information so acquired is output as is, but the infrared image information is output only after undergoing partial magnification correction by the signal processor 411.

The operating sequence of the flat-bed scanner of the present embodiment is basically the same as that of the first embodiment described in FIG. 5, so a description thereof will be omitted.

A description will now be given of the process of correcting for the dust and/or scratch marks on the film according to the present embodiment, with reference to FIG. 9 and FIG. 10.

Figure 9:
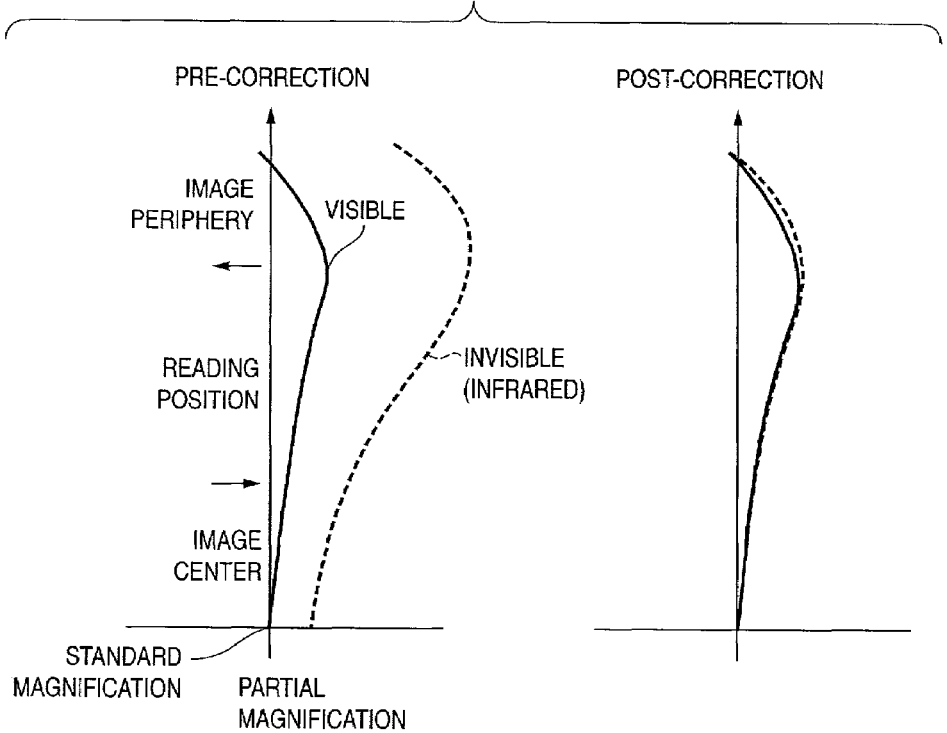
FIG. 9 shows partial magnification of an image by an image processing apparatus according to a second embodiment of the present invention.

FIG. 9 shows partial magnification of an image by an image processing apparatus according to a second embodiment of the present invention. FIG. 10 shows read image and image output by an image processing apparatus according to a second embodiment of the present invention.

As shown in FIG. 9, the focusing optical system of the flat-bed scanner of the present embodiment has a partial magnification characteristic, and accordingly the visible image information is output as is but the infrared image information is only output after undergoing correction of the partial magnification by the signal processor 411 described above.

In terms of the input image information shown in FIG. 9, the signal processor 111 labels a reading picture element (pixel) located at the center of the focusing optical system as pixel 0, such that, when correcting position information for an image positioned at x pixels away from the center pixel 0 in a peripheral direction, such pixel has a position y after correction that is expressed in terms of the following formula using correction factors $a_0, a_2, a_4$:

$$y = a_4 x^4 + a_2 x^2 + a_0 \quad (3)$$

The carriage-integrated flat-bed scanner of the present embodiment uses a relatively wide-angle lens, so compared to the image processing apparatus of the first embodiment, the distortion, chromatic difference of aberration and comatic aberration are relatively large. However, the magnification lines change direction at only one or two points, so good correction can be had using approximately the same number of correction factors as with the first embodiment described above.

Additionally, if the right side of the equation is not a whole number, then such result can be simplified by rounding to the nearest whole number. Moreover, since the correction factors are already recorded in the memory that is the recording means there is no need to calculate the correction factors prior to image reading, with the result that image reading can proceed quickly.

Figure 10:
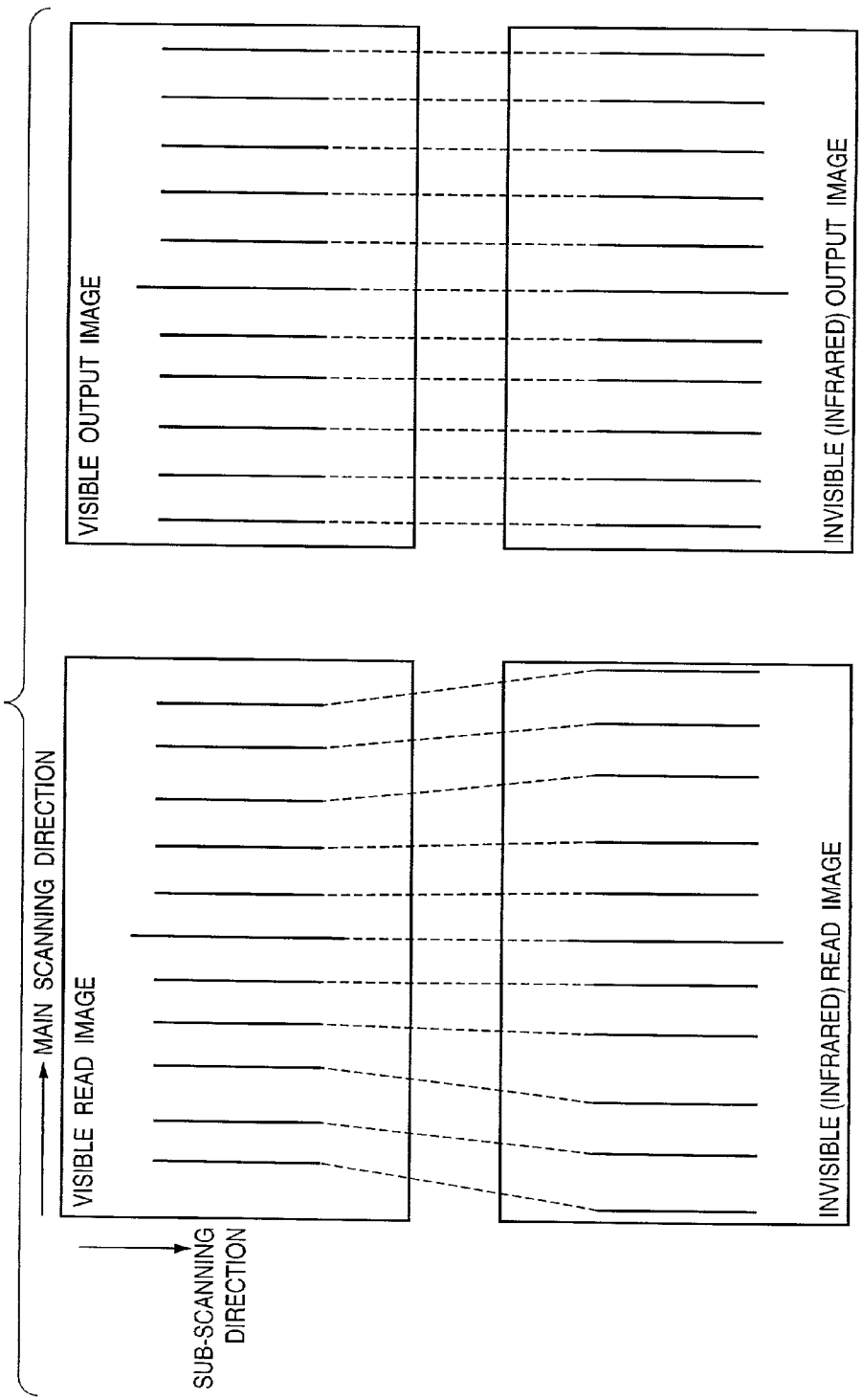
FIG. 10 shows read image and image output by an image processing apparatus according to a second embodiment of the present invention.

Thus, as described above and as shown in FIG. 9, the image processing apparatus according to the present invention can substantially match the partial magnification rates of the visible image information and the infrared (invisible) image information, so that, as shown in FIG. 10, the post-correction infrared (invisible) image information (that is, the infrared (invisible) output image) substantially matches the position information of the visible image information (that is, the visible output image), providing a film scanner that provides accurate deletion of dust and/or scratch marks.

As will be appreciated by those skilled in the art, the image processing apparatus of the present invention can be achieved with the above-described signal processor 411 built into the image processing apparatus or incorporated as driver software on a unit connected to the image processing apparatus. The unit may be a personal computer used as a controller.

A description will now be given of a second embodiment of an image processing apparatus according to a second embodiment of the present invention, with reference to FIGS. 11, 12 and 13.

Figure 11:
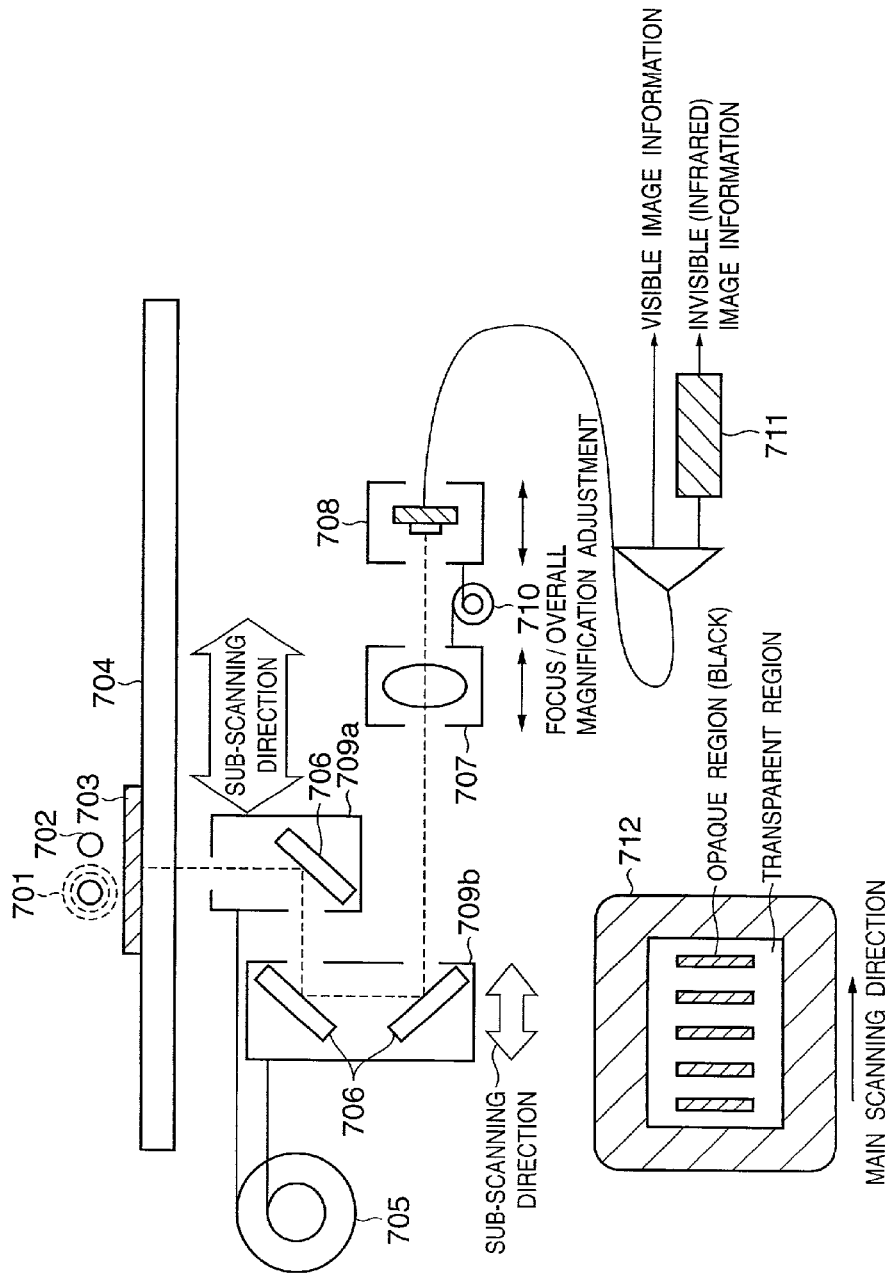
FIG. 11 is a schematic diagram of an image processing apparatus according to a third embodiment of the present invention.

FIG. 11 is a schematic diagram of an image processing apparatus according to a third embodiment of the present invention. FIG. 12 shows partial magnification of an image by an image processing apparatus according to a third embodiment of the present invention. FIG. 13 shows read image and image output by an image processing apparatus according to a third embodiment of the present invention.

The image information of a film 703 that is a transparent medium which is illuminated by either an infrared light source 701 or a visible light source 702 is reflected by a plurality of mirrors 406 and passed through a focusing lens 707 to focus on a line CCD 708 arranged in a main scanning direction. The film 703 is mounted on a film glass 704.

Of the reflecting mirrors 706, that which is closest to the film 703 is mounted on a first mirror mount 709a. The remaining two mirrors are mounted on a second mirror stand 709b. The respective mirror bases are moved by a drive unit 705 in the sub-scanning direction, at a speed ratio of 2:1, such that the images recorded on the film 703 are read as secondary image information by the line CCD 708.

Additionally, the flat-bed scanner of the present embodiment is equipped with a focus and overall magnification adjustment unit 710. The focus and overall magnification adjustment unit 710 is capable of moving the lens 707 and the CCD 708 along the axis of the light at different rates, so the focus and the overall magnification can be adjusted simultaneously, and further, the overall magnification can be equalized even when adjusting the focus to compensate for differences in focus due to the difference in wavelength of the infrared light from the infrared light source 701 and the visible light from the visible light source 702.

With such a configuration, the image information for both the infrared image and the visible image can be read in a state of optimum focus.

Figure 12:
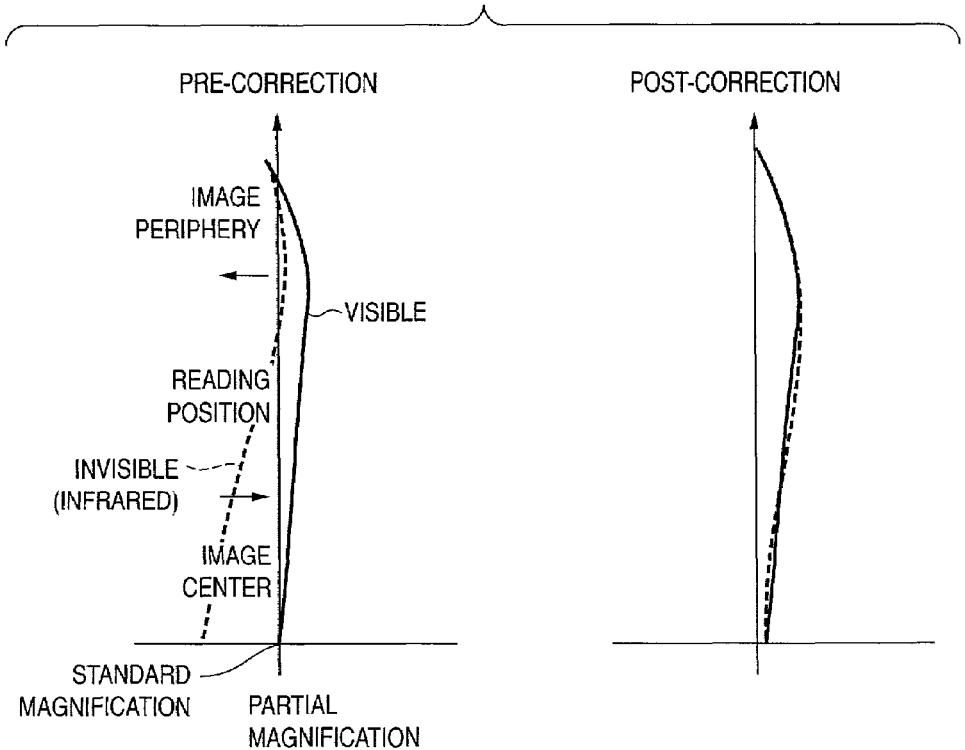
FIG. 12 shows partial magnification of an image by an image processing apparatus according to a third embodiment of the present invention.
Figure 13:
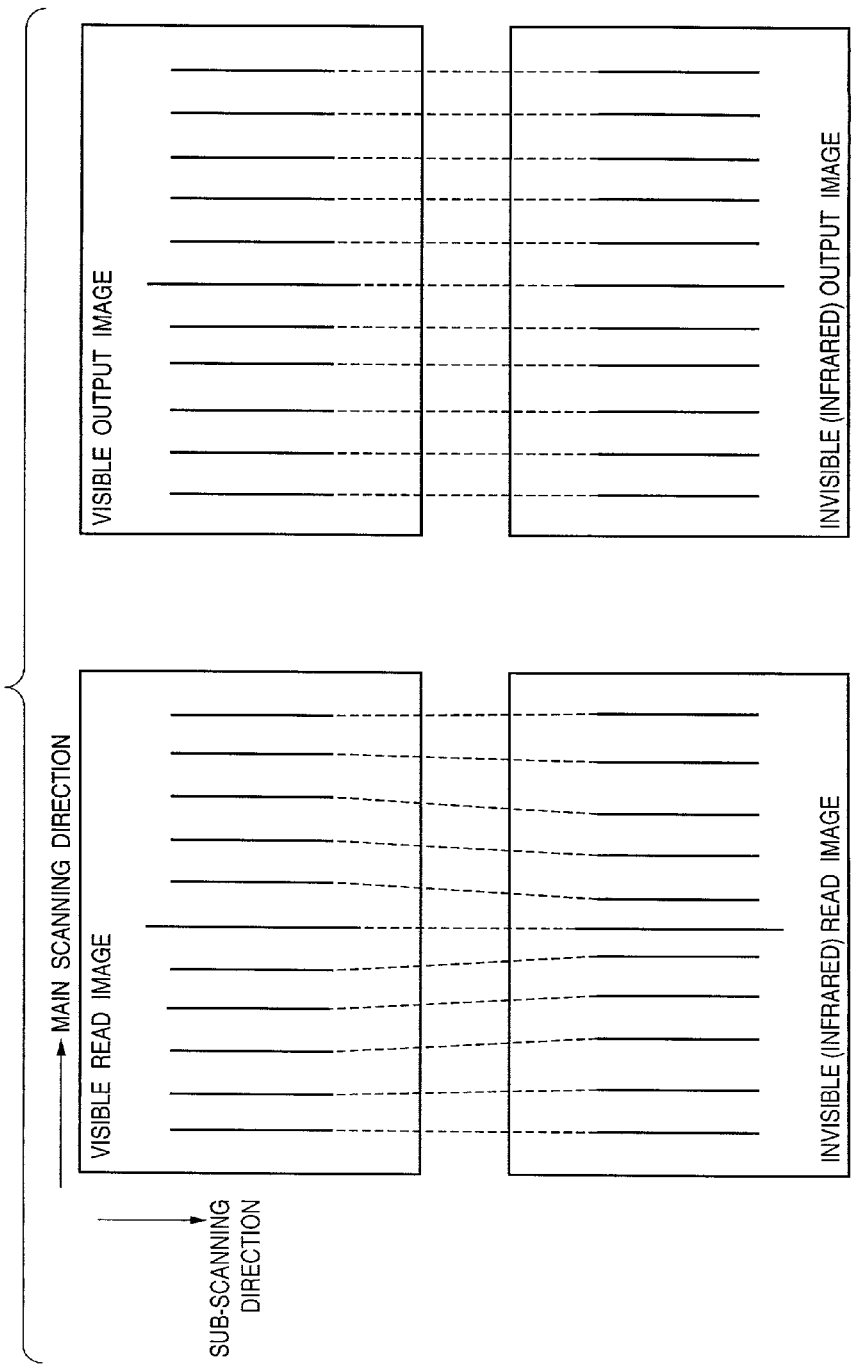
FIG. 13 shows read image and image output by an image processing apparatus according to a third embodiment of the present invention.

However, as shown in FIG. 12, even when the overall magnification of the infrared image information has been made to match the visible image information, the partial magnification at the center of the image can deviate due mainly to chromatic differences of magnification and comatic aberrations. As a result, although the input visible image information can be output as is, the infrared image information is only output after the partial magnification has been corrected by a signal processor 711.

In terms of the input image information shown in FIG. 12, the signal processor 711 labels a reading picture element (pixel) located at the center of the focusing optical system as pixel 0, such that, when correcting position information for an image positioned at x pixels away from the center pixel 0 in a peripheral direction has a position y after correction that is expressed in terms of the following formula that uses correction factors $a_0, a_2$:

$$y = a_2 x^2 + a_0 \quad (4)$$

It should be noted that the correction factors $a_0 \ldots a_n$ are set so that the infrared image pixel position information is substantially identical to the visible image pixel position information. In the present embodiment, the magnification difference between the infrared image and the visible image is relatively small, so even a small number of correction factors will suffice to correct the magnification. Further, where the difference in partial magnification between the visible image information and the infrared image information is small, the correction factor may be $y = a_1 x$. It should be noted that, if the right side of the equation is not a whole number, then such result can be simplified by rounding to the nearest whole number.

However, the flat-bed scanner of the present embodiment is a 2:1 mirror scan type and is equipped with a focus/overall magnification adjustment unit, so it has a large number of moving parts. A large number of moving parts tends to degrade the accuracy of the apparatus and cause partial magnification deviations to fluctuate. In order to counteract these drawbacks, the present embodiment is configured so as to calculate (that is, to update) the correction factors each time an image is read in order to correct deviations in the partial magnification of the image information.

In calculating the correction factors, a self-correcting chart 712 shown in FIG. 8 is read in place of the film. The correction factors are then set so that the partial magnification of the infrared image information and the partial magnification of the visible image information are the same.

By using correction factors calculated as described above, infrared image information that does not differ from the visible image information as shown in FIG. 12 can be acquired every time. As a result, the position of the post-correction infrared image information (infrared output image) matches that of the visible image information (visible output image) as shown in FIG. 13, providing a 2:1 mirror scan type flat-bed scanner that provides accurate deletion of dust and/or scratch marks.

Additionally, in the present embodiment it is possible to continuously optimize the correction factors as described above. Accordingly, even if for some reason the partial magnification difference fluctuates, the correction factors are continuously updated and optimized prior to infrared image reading, so the partial magnification difference can be corrected with extreme accuracy.

As will be appreciated by those skilled in the art, the image processing apparatus of the present invention can be achieved with the above-described signal processor 711 built into the scanner apparatus or incorporated as driver software on a unit connected to the scanner apparatus. The unit may be a personal computer used as a controller.

As described above, according to the present embodiment, differences in partial magnification between the visible image information and the infrared image information can be corrected with a simple, low-cost configuration.

It should be noted that the present invention can be adapted for use in a system comprising a plurality of devices, such as a host computer, and interface, a reader, a printer and the like, as well as for use with a single apparatus, such as a copier, a facsimile machine or the like.

It should be noted that the configurations and operations described above with reference to the individual embodiments, whether practiced individually and separately are whether practiced through an appropriate combination of several embodiments, are within the spirit and scope of the present invention.

The present invention is not limited to the above-described embodiments, and various changes and modifications can be made within the spirit and scope of the present invention. Therefore, to apprise the public of the scope of the present invention, the following claims are made.

What is claimed is:

1. An image processing apparatus for processing visible image information and invisible image information obtained from visible light and invisible light directed onto an original and from the original onto an image pick-up element via a focusing optical system, the image processing apparatus comprising a magnification correction unit that corrects a first partial magnification so that the first partial magnification of the invisible image information and a second partial magnification of the visible image information are identical.

2. The image processing apparatus according to claim 1, wherein the magnification correction unit labels a pixel positioned at the center of the focusing optical system pixel 0 and corrects a position y of a pixel positioned x number of pixels away from pixel 0 using a correction factor $a_0 \ldots a_n$ such that $Y=a_n x^n + a_{n-1} x^{n-1} + a_0 \ldots a_n$.

3. The image processing apparatus according to claim 2, wherein the correction factor is rewritten at a predetermined interval.

4. The image processing apparatus according to claim 2, further comprising a storage unit for storing the correction factor.

5. The image processing apparatus according to claim 1, further comprising:
a first light source for generating visible light; and
a second light source for generating invisible light.

6. The image processing apparatus according to claim 1, further comprising:
a focus correction unit for correcting a focal error generated by a difference in wavelength between visible light and invisible light.

7. The image processing apparatus according to claim 1, wherein the invisible image information is infrared image information obtained from infrared light directed onto the original and from the original onto the image pick-up element via the focusing optical system.

8. The image processing apparatus according to claim 1, wherein the original includes a transparent film.

9. An image processing method for processing visible image information and invisible image information obtained from visible light and invisible light via a focusing optical system, respectively, the image processing method comprising the steps of:
directing visible light and invisible light onto an original;
directing the light directed onto the original onto an image pick-up element; and
correcting a first partial magnification of the invisible image information so that the first partial magnification of the invisible image information and a second partial magnification of the visible image are identical.

10. The image processing method according to claim 9, wherein the correction step labels a pixel positioned at the center of the focusing optical system pixel 0 and corrects a position y of a pixel positioned x number of pixels away from pixel 0 using a correction factor $a_0 \ldots a_n$ such that $Y=a_n x^n + a_{n-1} x^{n-1} + a_0 \ldots a_n$.

11. The image processing method according to claim 10, wherein the correction factor is rewritten at a predetermined interval.

12. The image processing method according to claim 10, further comprising a correction factor storage step of storing the correction factor.

13. The image processing method according to claim 9, further comprising the steps of:
generating visible light from a visible light source; and
generating invisible light from an invisible light source.

14. The image processing method according to claim 9, further comprising a focus corrections step of correcting a focal error generated by a difference in wavelength between visible light and invisible light.

15. The image processing method according to claim 9, wherein the invisible image information is infrared image information obtained from infrared light directed onto the original and from the original onto the image pick-up element via the focusing optical system.

16. The image processing method according to claim 9, wherein the original includes a transparent film.

17. An image processing program stored on a computer readable medium for processing visible image information and invisible image information obtained from visible light and invisible light directed onto an original and from the original onto an image pick-up element via a focusing optical system, the image processing program causing a computer to correct a first partial magnification of the invisible image information so that the first partial magnification of the invisible image information and a second partial magnification of the visible image information are identical.

18. A computer readable recording machine for processing visible image information and invisible image information obtained from visible light and invisible light directed onto an original and from the original onto an image pick-up element via a focusing optical system, the recording medium storing an image processing program that causes a computer to correct a first partial magnification of the invisible image information so that the first partial magnification of the invisible image information and a second partial magnification of the visible image information are identical.

* * * * *